US007061137B2

(12) United States Patent
Flick

(10) Patent No.: US 7,061,137 B2
(45) Date of Patent: Jun. 13, 2006

(54) VEHICLE DATA COMMUNICATIONS BUS DISRUPTER AND ASSOCIATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 477 days.

(21) Appl. No.: 10/271,626

(22) Filed: Oct. 16, 2002

(65) Prior Publication Data

US 2004/0075538 A1     Apr. 22, 2004

(51) Int. Cl.
*B60R 25/10*     (2006.01)

(52) U.S. Cl. .................. 307/10.3; 340/5.31; 340/5.72; 340/426.11

(58) Field of Classification Search ............. 340/5.31, 340/5.72, 426.11; 307/10.3
See application file for complete search history.

(56) References Cited

U.S. PATENT DOCUMENTS

| 4,055,772 | A | 10/1977 | Leung | 307/10 |
|---|---|---|---|---|
| 4,383,242 | A | 5/1983 | Sassover et al. | 340/64 |
| 4,538,262 | A | 8/1985 | Sinniger et al. | 370/85 |
| 4,697,092 | A | 9/1987 | Roggendorf et al. | 307/10 |
| 4,760,275 | A | 7/1988 | Sato et al. | 307/10 |
| 4,792,783 | A | 12/1988 | Burgess et al. | 340/22 |
| 5,146,215 | A | 9/1992 | Drori | 340/825 |
| 5,252,966 | A | 10/1993 | Lambropoulos et al. | 340/825 |
| 5,307,048 | A | * 4/1994 | Sonders | 340/426.12 |
| 5,583,479 | A | 12/1996 | Hettich et al. | 340/426 |
| 5,719,551 | A | * 2/1998 | Flick | 340/426.25 |
| 6,542,947 | B1 | * 4/2003 | Buhring | 710/107 |
| 6,754,485 | B1 | * 6/2004 | Obradovich et al. | 455/414.1 |

OTHER PUBLICATIONS

"Surface Vehicle Information Report" by Society of Automotive Engineers, Inc. (SAE); No. J2058 issued Jun. 21, 1990.

"Surface Vehicle Standard" by Society of Automotive Engineers, Inc. (SAE); No. J1850 issued Nov. 1988 and revised in Jul. 1995.

(Continued)

*Primary Examiner*—Brian Sircus
*Assistant Examiner*—Dru Parries
(74) *Attorney, Agent, or Firm*—Allen, Dyer, Doppelt, Milbrath & Gilchrist, P.A.

(57) ABSTRACT

A vehicle security system may disrupt communications on a vehicle data communications bus, such as to prevent starting of the vehicle engine. The vehicle security system may include at least one vehicle security sensor, a vehicle data communications bus disrupter for disrupting communications on the vehicle data communications bus, and a security controller for selectively operating the vehicle data communications bus disrupter. The disrupter may be operated based upon the at least one vehicle security sensor to thereby disable the vehicle engine. The disrupter may alternately be operated based on a signal from a monitoring station that receives position information from the vehicle.

56 Claims, 8 Drawing Sheets

OTHER PUBLICATIONS

"The Thick and Thin of Car Cabling" by Thompson published in the IEEE Spectrum, Feb. 1996, pp. 42-45; Spectrum editor: Michael J. Riezenman.

SAE International, *In-Vehicle Electronics for IVHS Workshop, Speaker Handouts*, Nov. 30 and Dec. 1, 1995.

SAE International, *In-Vehicle Electronics for Intelligent Transportation Systems, Workshop II Results*, Jul. 9-10, 1996.

SAE International, Wolfgang Voss and Karlheinz Butscher, *In-Vehicle Data Bus Systems—the Key for New Concepts In Comfort and Convenience Electronics*, Feb. 26-29, 1996, pp. 1-9.

SAE International, Chuck Powers and Randy Frank, *The Consumerization of the Automotive Environment: The ITS Data Bus*, Aug. 6-8, 1997, pp. 1-7.

* cited by examiner

VEHICLE DATA COMMUNICATIONS BUS DISRUPTER AND ASSOCIATED METHODS

FIELD OF THE INVENTION

The present invention relates to the field of security and control systems and, more particularly, to security and control systems and related methods for a vehicle having a vehicle data communications bus.

BACKGROUND OF THE INVENTION

Vehicle security systems are widely used to deter vehicle theft, prevent theft of valuables from a vehicle, deter vandalism, and to protect vehicle owners and occupants. A typical vehicle security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be flashing of vehicle lights and/or sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by a user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related to remote control of a vehicle function U.S. Pat. No. 5,252,966 to Lambropoulous et al. discloses a remote keyless entry system for a vehicle. The keyless entry system permits the user to remotely open the vehicle doors or open the vehicle trunk using a small handheld transmitter.

Unfortunately, the majority of vehicle security systems need to be directly connected by wires to individual vehicle devices, such as the vehicle horn or door switches of the vehicle. In other words, a conventional vehicle security system is hardwired to various vehicle components, typically by splicing into vehicle wiring harnesses or via interposing T-harnesses and connectors. The number of electrical devices in a vehicle has increased so that the size and complexity of wiring harnesses has also increased. For example, the steering wheel may include horn switches, an airbag, turn-signal and headlight switches, wiper controls, cruise control switches, ignition wiring, an emergency flasher switch, and/or radio controls. Likewise, a door of a vehicle, for example, may include window controls, looks, outside mirror switches, and/or door-panel light switches.

In response to the increased wiring complexity and costs, vehicle manufacturers have begun attempts to reduce the amount of wiring within vehicles to reduce weight, reduce wire routing problems, decrease costs, and reduce complications which may arise when troubleshooting the electrical system. For example, some manufacturers have adopted multiplexing schemes to reduce cables to three or four wires and to simplify the exchange of data among the various onboard electronic systems as disclosed, for example, in an article titled, "The Thick and Thin of Car Cabling" by Thompson appearing in the IEEE Spectrum, February 1996, pp. 4245.

Implementing multiplexing concepts in vehicles in a cost-effective and reliable manner may not be easy. Successful implementation, for example, may require the development of low or error free communications in what may be considered harsh vehicle environments. With multiplexing technology, the various electronic modules or devices may be linked by signal wire in a bus that also contains a power wire, and one or more ground wires. Digital messages are communicated to all modules over the data communications bus. Each message may have one or more addresses associated with it so that the devices can recognize which messages to ignore and which messages to respond to or read.

The Thompson article describes a number of multiplexed networks for vehicles. In particular, the Grand Cherokee made by Chrysler is described as having five multiplex nodes or controllers: the engine controller, the temperature controller, the airbag controller, the theft alarm, and the overhead console. Other nodes for different vehicles may include a transmission controller, a trip computer, an instrument cluster controller, an antilock braking controller, an active suspension controller, and a body controller for devices in the passenger compartment.

A number of patent references are also directed to digital or multiplex communications networks or circuits, such as may be used in a vehicle. For example, U.S. Pat. No. 4,538,262 to Sinniger et al. discloses a multiplex bus system including a master control unit and a plurality of receiver transmitter units connected thereto. Similarly, U.S. Pat. No. 4,055,772 to Leung discloses a power bus in a vehicle controlled by a low current digitally coded communications system. Other references disclosing various vehicle multiplex control systems include, for example, U.S. Pat. No. 4,760,275 to Sato et al.; U.S. Pat. No. 4,697,092 to Roggendorf et al.; and U.S. Pat. No. 4,792,783 to Burgess et al.

Several standards have been proposed for vehicle multiplex networks including, for example, the Society of Automotive Engineers (SAE), "Surface Vehicle Standard, Class B Data Communications Network Interface", SAE J1850, July 1995. Another report by the SAE is the "Surface Vehicle Information Report, Chrysler Sensor and Control (CSC) Bus Multiplexing Network for Class 'A' Applications", SAE J2058, July 1990. Many other networks are also being implemented or proposed for communications between vehicle devices and nodes or controllers.

Unfortunately, conventional vehicle security systems for hardwired connection to vehicle devices, such as aftermarket vehicle security systems, are not readily adaptable to a vehicle including a vehicle data communications bus. Moreover, a vehicle security system, if adapted for a vehicle data communications bus and devices for one particular model, model year, and manufacturer, may not be compatible with any other models, model years, or manufacturers. Other systems for remote control of vehicle functions may also suffer from such shortcomings.

One significant advance in the field of vehicle security systems for vehicles having data communications buses is found in U.S. Pat. No. 5,719,551 to Flick, the entire contents of which are incorporated herein by reference. The patent discloses a vehicle security system that is adaptable for installation in a vehicle having a data communications bus, and wherein the controller may learn or otherwise have downloaded thereto the desired device codes for a given vehicle from among a plurality of vehicles. In other words, the vehicle security system may be readily adapted to a vehicle including a data communications bus and may provide an alarm indication that deters vehicle theft. This device, while especially useful in many applications, may be relatively complicated for a more basic application, such as preventing engine starting, for example.

SUMMARY OF THE INVENTION

In view of the foregoing background, it is therefore an object of the present invention to provide a system that is readily adaptable for installation in a vehicle having a data communications bus and that is suitable for vehicle control applications, such as preventing or disabling vehicle engine starting, for example.

This and other objects, advantages, and features of the present invention are provided by a vehicle security or control system including a vehicle data communications bus disrupter for selectively disrupting communications on the vehicle data communications bus. More particularly, the vehicle system may be for a vehicle comprising a vehicle engine, at least one vehicle engine device, such as enabling starting of the vehicle engine, and a vehicle data communications bus carrying communications for the at least one vehicle device. The vehicle system may further comprise a security controller for selectively operating the vehicle data communications bus disrupter based upon at least one vehicle security sensor to disable the vehicle engine. The plurality of vehicle devices may comprise an engine starter, an engine ignition device, or an engine fuel supply device, for example. The data bus disrupter provides a relatively simple and cost-effective approach to interface a starter interrupt feature in a vehicle including a data communications bus, for example.

The vehicle data communications bus disrupter may be inductively coupled or directly connected to the vehicle data communications bus via a hard wired connection. The directly connected configuration may connect a plurality of electrical conductors of the data bus together, or may connect at least one electrical conductor to a reference voltage. A disruption signal may also be generated and placed on the data bus.

The vehicle security system may alternately or additionally include a positioning determining device and a wireless communications device, both connected to the security controller, for communicating position information to a monitoring station. The security controller may also selectively operate the vehicle data communications bus disrupter responsive to the monitoring station. In other words, the starter interrupt feature can be selected from a user away from the vehicle and can be communicated to the vehicle. In some embodiments, the one or more vehicle security sensors may be connected to the security controller via the vehicle data communications bus. Accordingly, the security controller may turn off the vehicle data communications bus disrupter based on a predetermined event to permit renewed communication with the vehicle security sensors, for example. The predetermined event may include a predetermined time, a predetermined number of vehicle ignition cycles, or a predetermined signal received from a remote transmitter carried by a user, for example.

The vehicle security sensor may comprise at least one of a door switch, a hood switch, a trunk switch, a proximity sensor, and a motion sensor. Additionally, the vehicle security system may include an alarm indicator connected directly to the security controller or indirectly via the vehicle data communications bus. The alarm indicator may include at least one of a vehicle light, a vehicle horn, a siren, a speech message generator, and a remote pager. The security controller may be switchable between armed and disarmed modes, and the system may further include a remote transmitter carried by a user for switching the security controller between the armed and disarmed modes.

In other embodiments, the vehicle control system may include different types of control devices for operating the data bus disrupter. For example, the control device may comprise at least one of a token reader, a biometric reader, a remote station receiver, and a personal identification number code reader. Of course, for many of the embodiments, the control device may also include an ignition switch sensor.

The vehicle data communications bus disrupter may comprise control logic for receiving as an input at least one control signal. The disrupter may also include an output circuit to be coupled to the vehicle data communications bus and being responsive to the control logic for selectively disrupting communications on the vehicle data communications bus for at least one vehicle device based upon the at least one control signal. The output circuit may comprise at least one switch for connecting a plurality of electrical conductors of the data bus together. Alternately, the output circuit may comprise at least one switch for connecting at least one electrical conductor of the data bus to a voltage reference, such as ground or the positive vehicle supply. In other embodiments, the output circuit may comprise a disrupting signal generator for generating a disrupting signal onto the at least one electrical conductor. In still other embodiments, the output circuit may further comprise an inductive coupling interface for inductively coupling the disrupting signal generator onto the at least one electrical conductor.

One method aspect of the invention is for disabling a vehicle engine for a vehicle comprising at least one vehicle engine device, and a vehicle data communications bus carrying communications for the at least one vehicle engine device. The method may comprise selectively disrupting communications on the vehicle data communications bus to disable the vehicle engine. For example, the at least one vehicle engine device may comprise at least one of an engine starter, an engine ignition device, an engine fuel supply device.

Another method aspect of the invention is for disrupting communications for at least one vehicle device connected to a vehicle data communications bus. The method may comprise coupling an output circuit to the vehicle data communications bus for selectively disrupting communications on the vehicle data communications bus for the at least one vehicle device based upon the at least one control signal. For example, the at least one vehicle device may comprise at least one of an engine starter, an engine ignition device, and an engine fuel supply device.

DETAILED DESCRIPTION OF THE PREFERRED EMBODIMENTS

Figure 1:
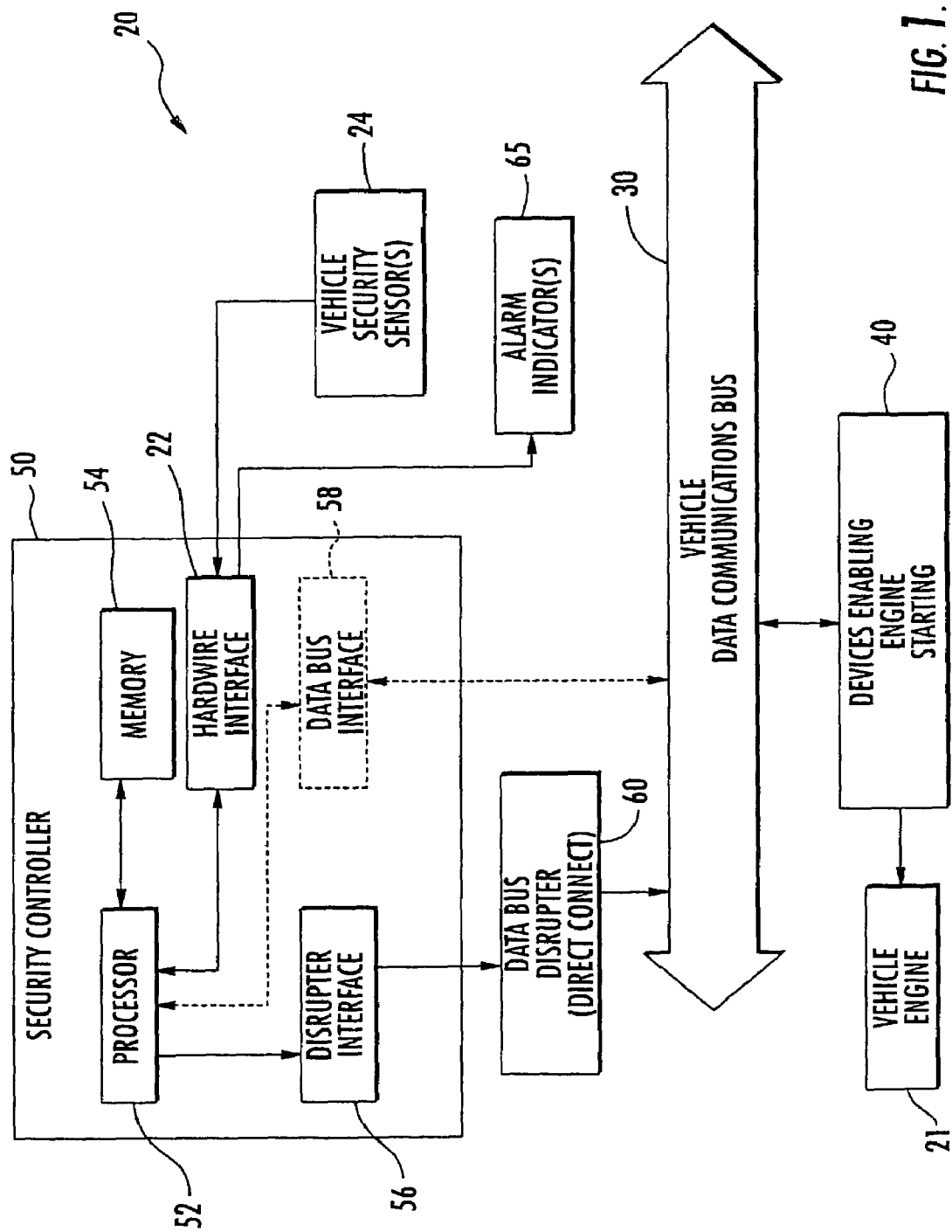
FIG. 1 is a schematic block diagram of a first embodiment of a vehicle security system according to the present invention.
Figure 2:
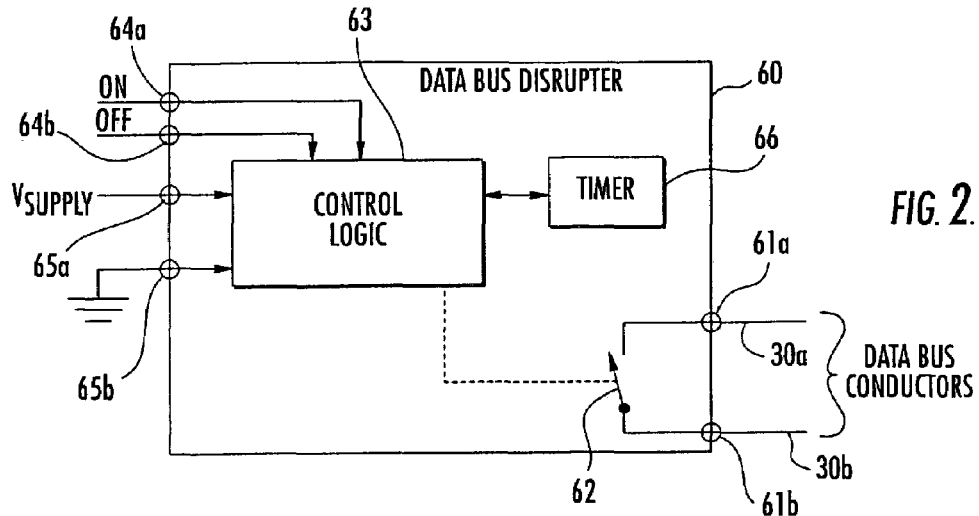
FIG. 2 is a more detailed schematic block diagram of the vehicle data communications bus disrupter as shown in FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notations are used in alternate embodiments to indicate similar elements.

Referring initially to FIGS. 1–4, a first embodiment of vehicle security system 20 is now described. The vehicle security system 20 is for a vehicle comprising a vehicle engine 21, a plurality of vehicle devices 40 enabling starting of the vehicle engine, and a vehicle data communications bus 30 extending through the vehicle and carrying communications for the vehicle devices. The vehicle data communications bus 30 may include wires and/or optical fibers, for example, connected between the vehicle devices 40 so that the vehicle devices may communicate with one another, as understood by those skilled in the art.

Each of the vehicle devices typically includes a transmitter and receiver to transmit and receive signals from the vehicle data communications bus 30. In addition, each vehicle device 40 may include associated circuitry for performing a function based on received signals, and/or sensing circuitry for sensing a condition to be transmitted onto the data bus 30 as will also be appreciated by those skilled in the art. The vehicle security system 20 illustratively includes a vehicle security sensor or sensors 24 connected to the security controller 50. The vehicle security sensor 24 may include one or more of a door switch, a hood switch, a trunk switch, a proximity sensor, a motion sensor, for example, or any other type of vehicle security sensor that is capable of monitoring the security status of the vehicle as understood by those skilled in the art. The vehicle security sensor 24 is illustratively connected to the processor 52 of the security controller 50 via a hardwired interface 22.

The security controller 50 includes the processor 52, and a memory 54 connected to the processor. A vehicle data communications bus disrupter interface 56 connects the processor 52 to the data bus disrupter 60. Similarly, an optional vehicle data communications bus interface 58 may connect the processor 52 to the data bus 30 in some embodiments. The vehicle data communications bus disrupter 60 disrupts communications on the vehicle data communications bus 30, and the security controller 50 selectively operates the vehicle data communications bus disrupter 60 based upon the vehicle security sensor 24 to disable the vehicle engine. By disabling means that if the vehicle is not currently running, the engine 21 will not be allowed to start. If the vehicle engine 21 is already running, it may be immediately shut down or simply kept from restarting once it has been shut down. In either case, the engine is still disabled.

In the illustrated embodiment of FIG. 1, the vehicle data communications bus disrupter 60 is illustratively directly connected, i.e., hard wired, to the vehicle data communications bus 30. The vehicle security system 20 also illustratively includes an alarm indicator 65 connected to the security controller 50 to provide an alarm indication. The alarm indicator 65 may be a vehicle light, a vehicle horn, a siren, a speech message generator, a remote pager, or any other type of indicator as understood by those skilled in the art. The alarm indicator 65 may be operated by the controller 50 based upon activation of a vehicle sensor 24, for example, such as to deter a would-be thief. Disrupting the vehicle data communications bus 30 may be achieved in any of a number of different ways. For example, in the embodiment of the disrupter 60 shown in FIG. 2, the data bus 30 includes a pair of electrical conductors 30a, 30b connected to a corresponding pair of disrupter outputs 61a, 61b. The electrical conductors may be selectively connected together by the schematically illustrated switch 62 that, in turn, is connected to the control logic 63. The control logic 63 illustratively includes a pair of inputs 64a, 64b that may receive ON and OFF control signals, respectively. The control logic 63 is also illustratively connected to power inputs 65a, 65b such as for the vehicle positive voltage and ground, respectively. A timer 66 is illustratively connected to the control logic 63 as may be used in some embodiments to provide self-contained timing functions as will be appreciated by those skilled in the art. Again, in this embodiment of the vehicle data communications bus disrupter 60, two or more conductors 30a, 30b of the data bus 30 may be shorted together, or through a resistor (not shown) to thereby disrupt communications on the data bus as will also be appreciated by those skilled in the art. Considered in somewhat different terms, the switch 62 provides an output circuit connected to the data communications bus 30.

Figure 3:
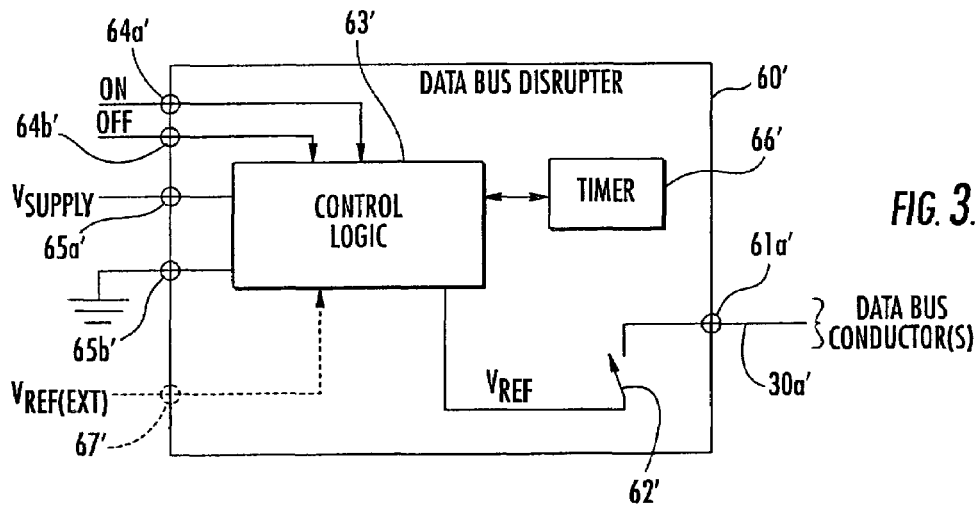
FIG. 3 is a more detailed schematic block diagram of an alternate embodiment of a vehicle data communications bus disrupter as shown in FIG. 2.

Turning now more specifically to FIG. 3, another embodiment of the disrupter 60 is now described. In this embodiment, at least one electrical conductor 30a of the data bus 30 may be selectively connected to a reference voltage, such as ground, for example, or any other suitable reference voltage that will cause disruption of communications on the data communications bus. The reference voltage Vref may be generated internally, or may be received on an external reference voltage input 67. Of course, more than one electrical conductor may be connected to the same or different reference voltages as will be appreciated by those skilled in the art. The other portions of the disrupter 60 are similar to those discussed above and require no further discussion herein.

Figure 4:
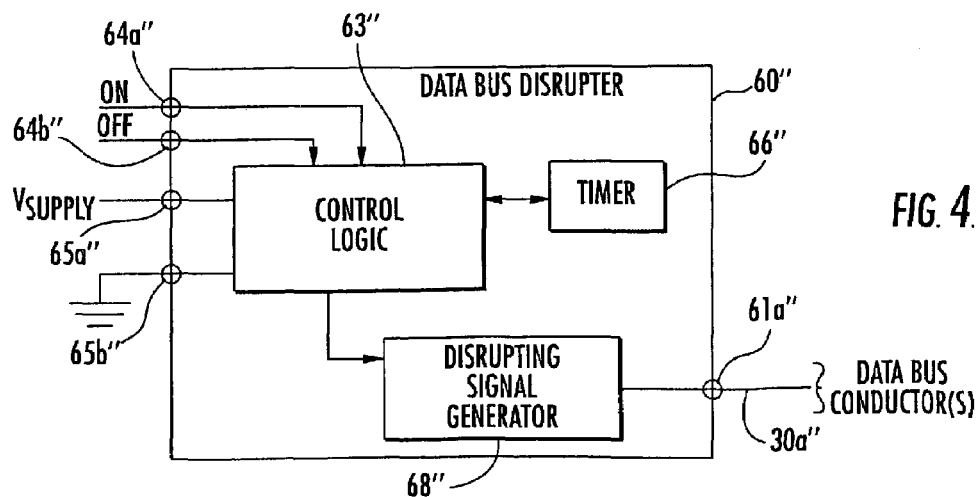
FIG. 4 is a more detailed schematic block diagram of another embodiment of a vehicle data communications bus disrupter as shown in FIG. 2.

Referring now more specifically to FIG. 4, still another embodiment of a vehicle data communications bus disrupter 60 is now described. This disrupter 60 can also be used in the overall vehicle security system 20 as shown in FIG. 1, for example, as well as in other systems as described in greater detail below.

The illustrated disrupter 60 includes a disrupting signal generator 68 as its output circuit. The disrupting signal generator 68 may send out interfering signals, noise, etc., which blocks device receivers, as will be appreciated by those skilled in the art. For example, the disrupter 60 may transmit noise, or broadband energy, on the vehicle data communications bus 30 so that the receivers of the vehicle devices 40 are unable to detect other signals. For example, for a data bus 30 employing a collision avoidance communications scheme, the disrupter 60 may constantly send signals on the data bus so that no device will have an opening to send its transmission.

Yet another representative approach to disrupting the data communications bus 30 is to transmit signal codes that would keep the device circuitry busy performing other functions instead of starting. Of course, those of skill in the art will appreciate yet other ways in which the disrupter 60 can jam or disrupt communications on the data bus 30 and thereby disable the vehicle engine 21, for example. These disrupting techniques may be used for electrical and/or fiber optic type data busses as will also be appreciated by those skilled in the art.

Figure 5:
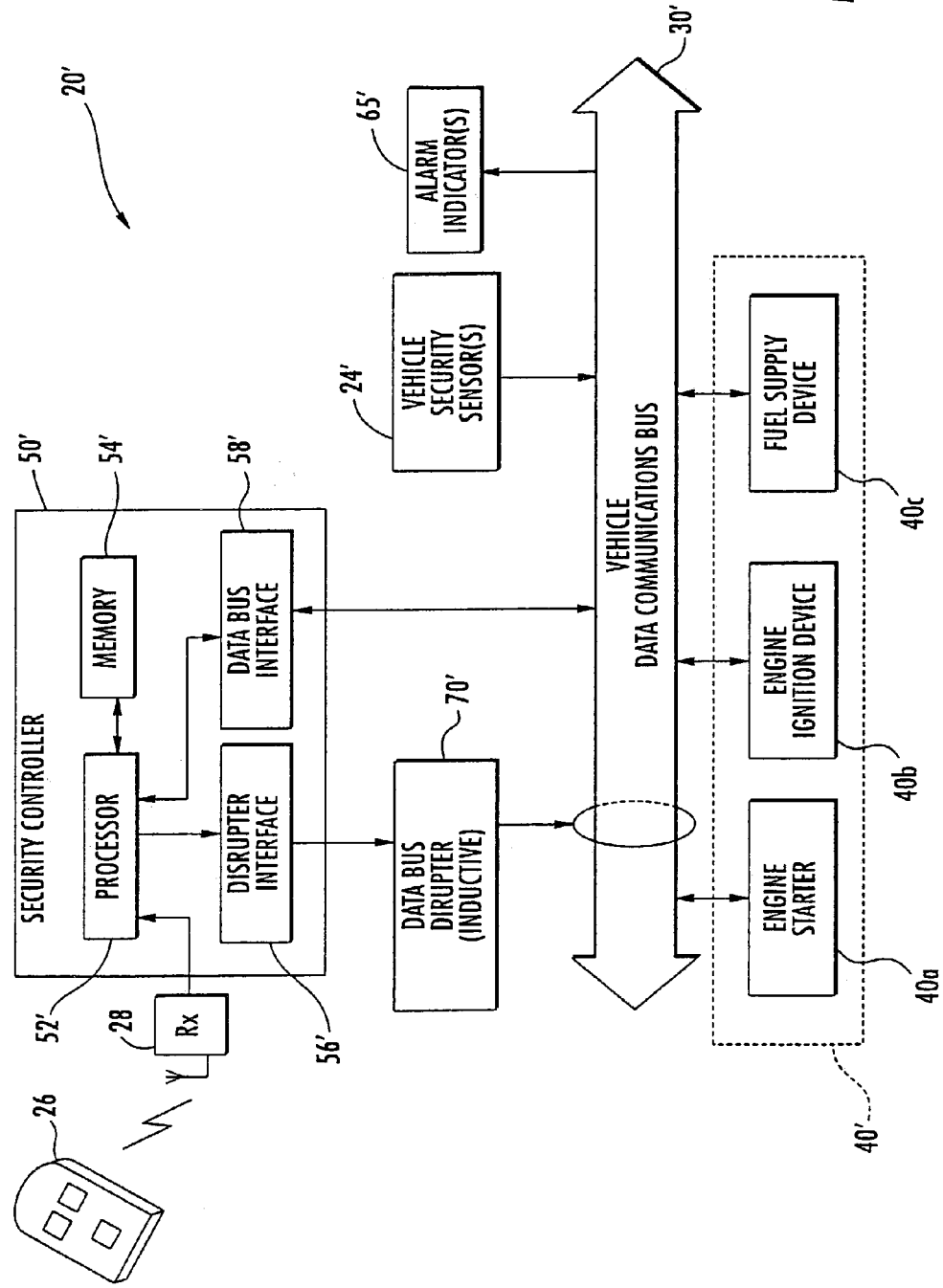
FIG. 5 is a schematic block diagram of a second embodiment of the vehicle security system according to the present invention.
Figure 6:
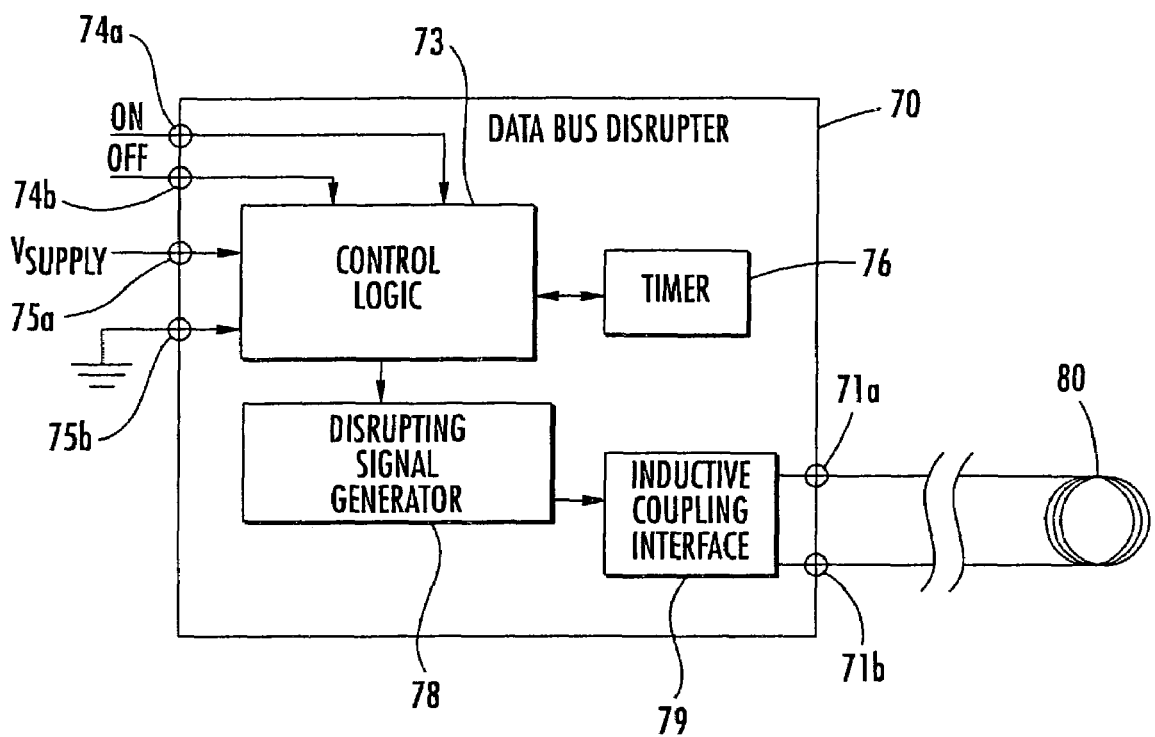
FIG. 6 is a more detailed schematic block diagram of the vehicle data communications bus disrupter as shown in FIG. 5.

Turning now additionally to FIGS. 5 and 6, another similar embodiment of the vehicle security system is now described. The vehicle security system 20 illustratively includes the security controller 50 which is connected to the vehicle data communications bus disrupter 70 via the illustrated disrupter interface 56. The vehicle data communications bus disrupter 70 is illustratively inductively coupled to the vehicle data communications bus 30, although in other embodiments it could also be directly hard wire connected to the data bus as will be appreciated by those skilled in the art. The inductive coupling does not require direct connection or splicing to the wires of the data bus 30, for example. The vehicle devices 40 may include one or more of an engine starter 40a, an engine ignition device 40b, an engine fuel supply device 40c, and any other device that is involved with starting the vehicle engine as understood by those skilled in the art.

The security controller 50 may also be switchable between armed and disarmed modes responsive to signals from a remote transmitter 26. The remote transmitter 26 is typically carried by a user for switching the security controller 50 between armed and disarmed modes. The security controller 50 is illustratively connected to a receiver 28 for receiving signals from the remote transmitter 26.

In this embodiment of the security system 20, the vehicle security sensor or sensors 24 and alarm indicator 65 are connected to the controller 50 through the data communications bus 30. Accordingly, the security controller 50 may also turn off the vehicle data communications bus disrupter 60 based upon a predetermined event to permit renewed communications with the vehicle security sensor 24 and/or the alarm indicator 65, for example. The predetermined event may include the passing of a predetermined time, a predetermined number of vehicle ignition cycles, or a predetermined communication from the remote transmitter 26 carried by a user, for example. The memory 54 and data bus interface 58 are connected to the processor 52 and are similar to the corresponding devices described above with respect to the security system 20 of FIG. 1. Accordingly, these devices need no further discussion herein.

As shown in FIG. 6, the disrupter 70 includes circuitry similar to that of the embodiment shown in FIG. 4; however, the disrupter 70 illustratively includes an inductive coupling interface 79 to interface the disrupting signals from the disrupting signal generator 78 to an inductive coupling loop 80, for example, that may be placed in proximity to the data communications bus 30 as will be appreciated by those skilled in the art.

The disrupter 70 illustratively includes a pair of disrupter outputs 71a, 71b connected to the inductive coupling loop 80. The disrupter outputs 71a, 71b are connected to the disrupting signal generator 78 via the schematically illustrated inductive coupling interface 79 that, in turn, is connected to the control logic 63. The control logic 73 illustratively includes a pair of inputs 74a, 74b that may receive ON and OFF control signals, respectively. The control logic 73 is also illustratively connected to power inputs 75a, 75b such as for the vehicle positive voltage and ground, respectively. A timer 76 is illustratively connected to the control logic 73 as may be used in some embodiments to provide self-contained timing functions as will be appreciated by those skilled in the art.

Figure 7:
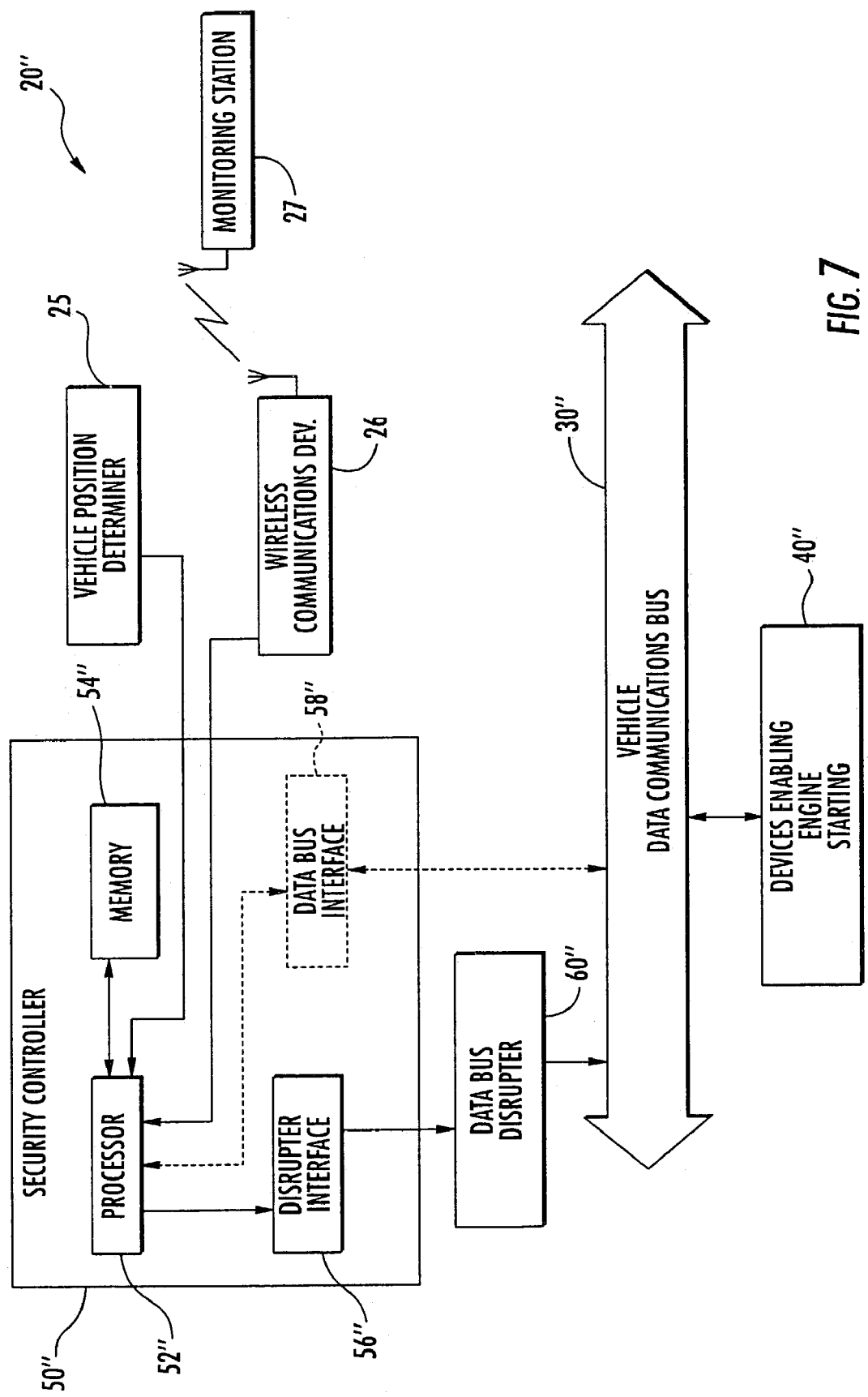
FIG. 7 is a schematic block diagram of a third embodiment of the vehicle security system according to the present invention.

Referring now to FIG. 7, another variation of a vehicle security system 20 is now described. In this embodiment, the vehicle security system 20 illustratively includes a vehicle position determining device 25 connected to the processor 52 of the controller 50, and a wireless communications device 26 also connected to the processor. As will be readily appreciated by those skilled in the art, the security controller 50 cooperates with the wireless communications device 26 and the vehicle position determining device 25 for sending vehicle position information to a monitoring station 27. The monitoring station 27 may be a central monitoring station serving a number of subscribers, or may be a monitoring station specific to a given user. In other words, in this embodiment, the security system 20 provides vehicle position tracking features.

Other tracking features may also be incorporated into the system 20 as also disclosed, for example, in copending patent application entitled, Vehicle Tracker Including Stationary Time Determination and Associated Methods, Ser. No. 09/859,727, filed May 17, 2001 and to the inventor of the present invention. Additional tracking features are also described in copending patent application entitled, Vehicle Tracker Including Deviation in Direction Methods, Ser. No. 10/105,778, filed Mar. 25, 2002 also to the inventor of the present invention. The entire contents of both of these applications are incorporated herein by reference.

In this embodiment, the security controller 50 also selectively operates the vehicle data communications bus disrupter 60 to disrupt communications on the vehicle data communications bus 30 and thereby prevent starting of the vehicle engine. The controller 50 causes disrupting based upon signals received from the monitoring station 27. In other words, a disrupting signal is illustratively transmitted from the monitoring station 27 to the wireless communications device 26 which cooperates with the security controller 50 to jam communications on the vehicle data communications bus 30. Other elements described above with reference to FIGS. 1 and 5 are indicated with double prime notation and need no further discussion herein.

Figure 8:
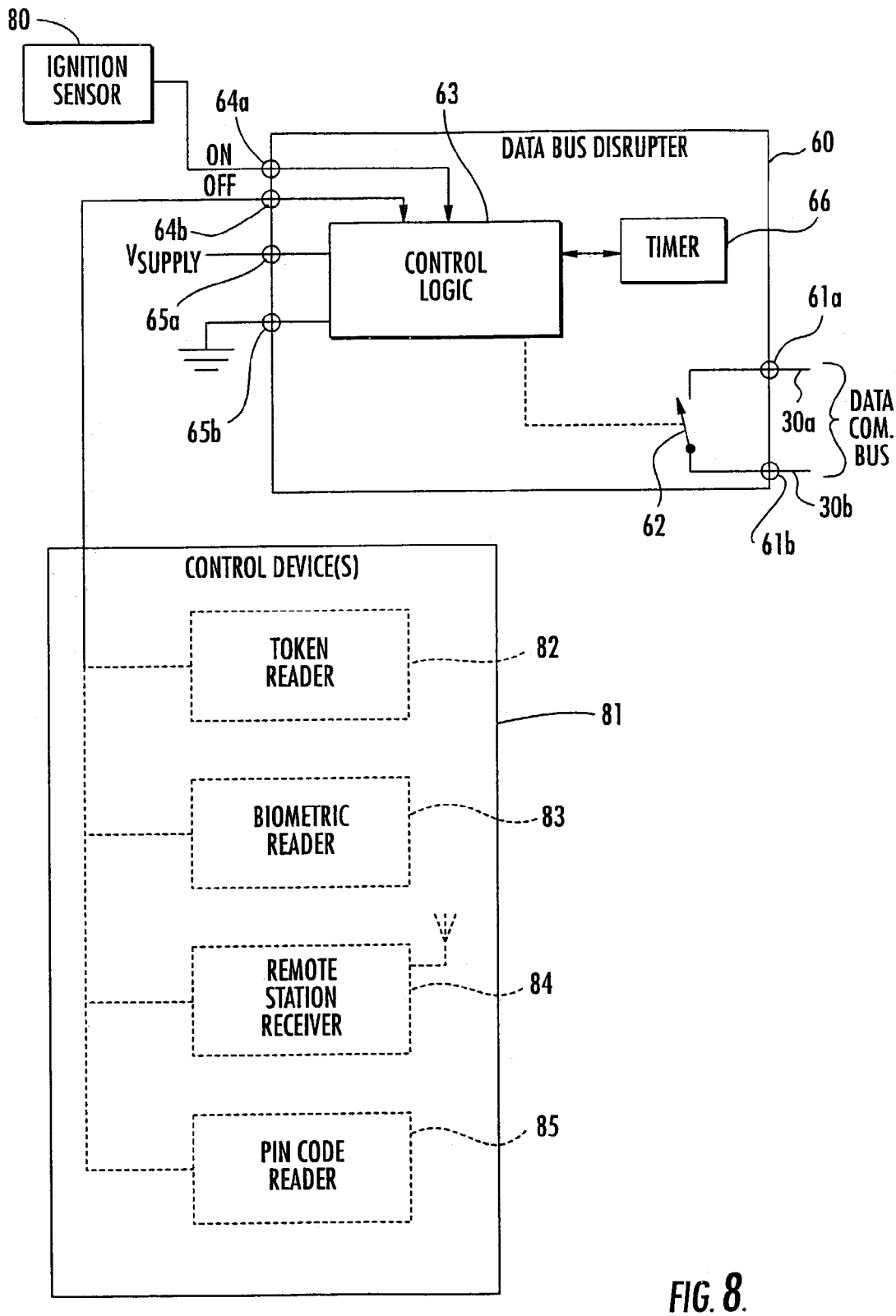
FIG. 8 is a schematic block diagram of yet another embodiment of a vehicle control system in accordance with the present invention.

Referring now additionally to FIG. 8, other variations of control system configurations using the vehicle data bus communications disrupter 60 are now further described. Although the disrupter 60 as or under the control of another, such as to facilitate repossession of a vehicle, for example.

Yet another illustrated example of a control device 81 is the schematically illustrated personal identification (PIN) code reader 85. The PIN code reader 85 may be provided by one or more simple depressible switches, or a more complicated numeric keypad, for example, as will also be appreciated by those skilled in the art. The PIN code reader 85 provides additional security to the user, since without proper entry of the PIN code, the vehicle engine could not be started, for example.

In addition, those of skill in the art will appreciate other sources of control signals for the vehicle data communications bus disrupter 60 as described herein. Moreover, in addition to disabling the vehicle engine, the disrupter 60 can be used to defeat other functions controlled by the data communications bus 30. For example, the vehicle door locks could also be defeated by the disrupter as when a vehicle possessor fails to make timely car payments, for example.

Those of skill in the art will appreciate many other additional scenarios advantageously benefiting from the disrupter as described herein.

Figure 9:
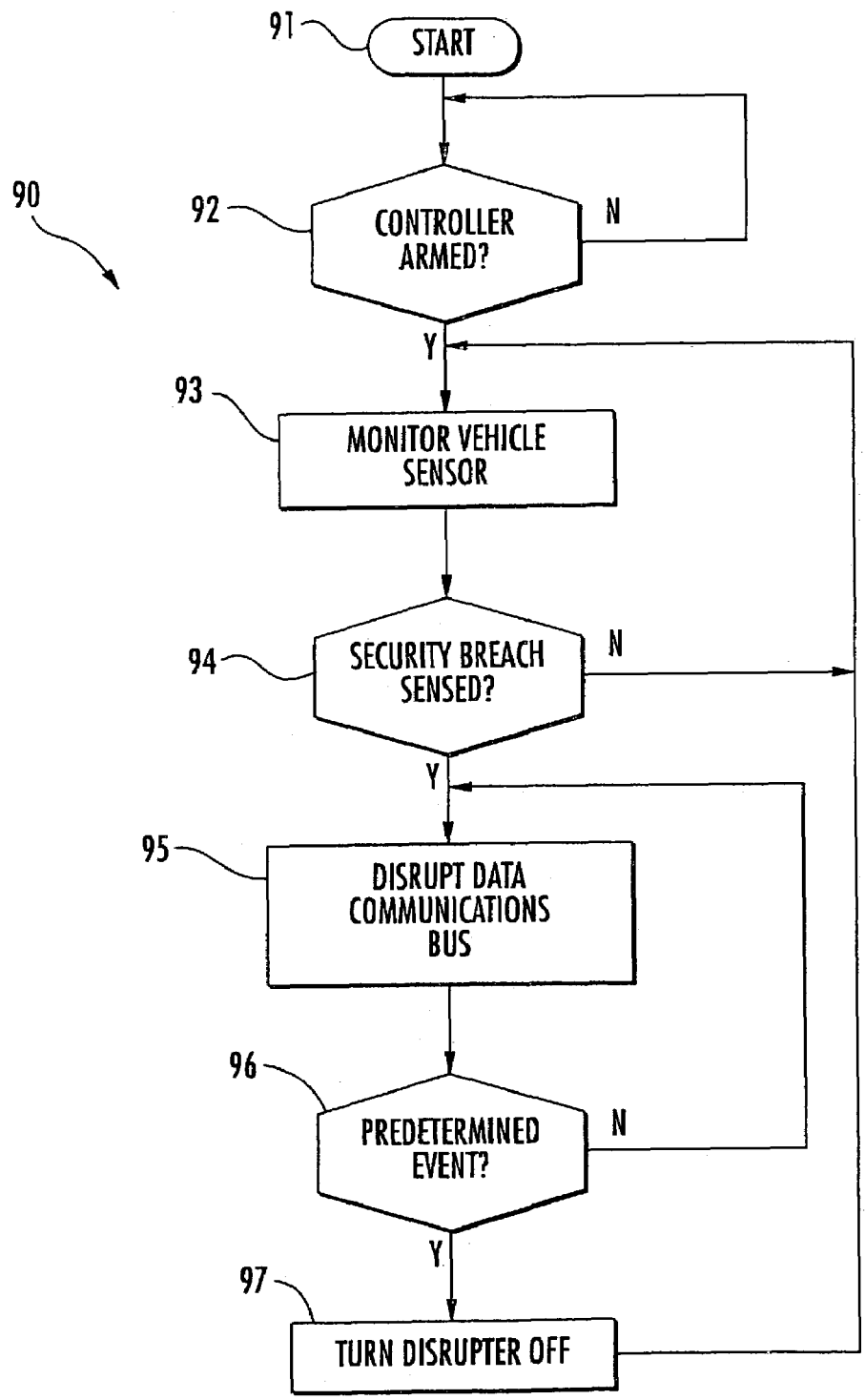
FIGS. 9 and 10 are flow charts showing operation of the vehicle security systems according to the present invention.

Turning now additionally to the flowchart 90 of FIG. 9, a method of using the vehicle security system 20 is now described. From the start (Block 91) it is determined whether the security controller 50 is armed at Block 92. If it is determined at Block 92 that the security controller 50 is not armed, then the vehicle security system 20 awaits the arming of the security controller. If, however, at Block 92 it is determined that the security controller 50 is armed, then vehicle security sensor 24 is monitored at Block 93. At Block 94 it is determined whether the vehicle security sensor 24 has sensed a security breach. If it is determined that a security breach has not been sensed, then the vehicle security sensor 24 is again monitored at Block 93. If, however, it is determined at Block 94 that a security breach has been sensed, then the vehicle data communications bus 30 is jammed at Block 95.

At Block 96, it is determined whether a predetermined event has occurred. If it is determined at Block 96 that the predetermined event has not occurred, then disrupting of the vehicle data communications bus is continued. If, however, it is determined at Block 96 that the predetermined event has occurred, then the vehicle data communications bus disrupter 60 is turned off. The vehicle security sensor 24 is then monitored at Block 93.

Figure 10:
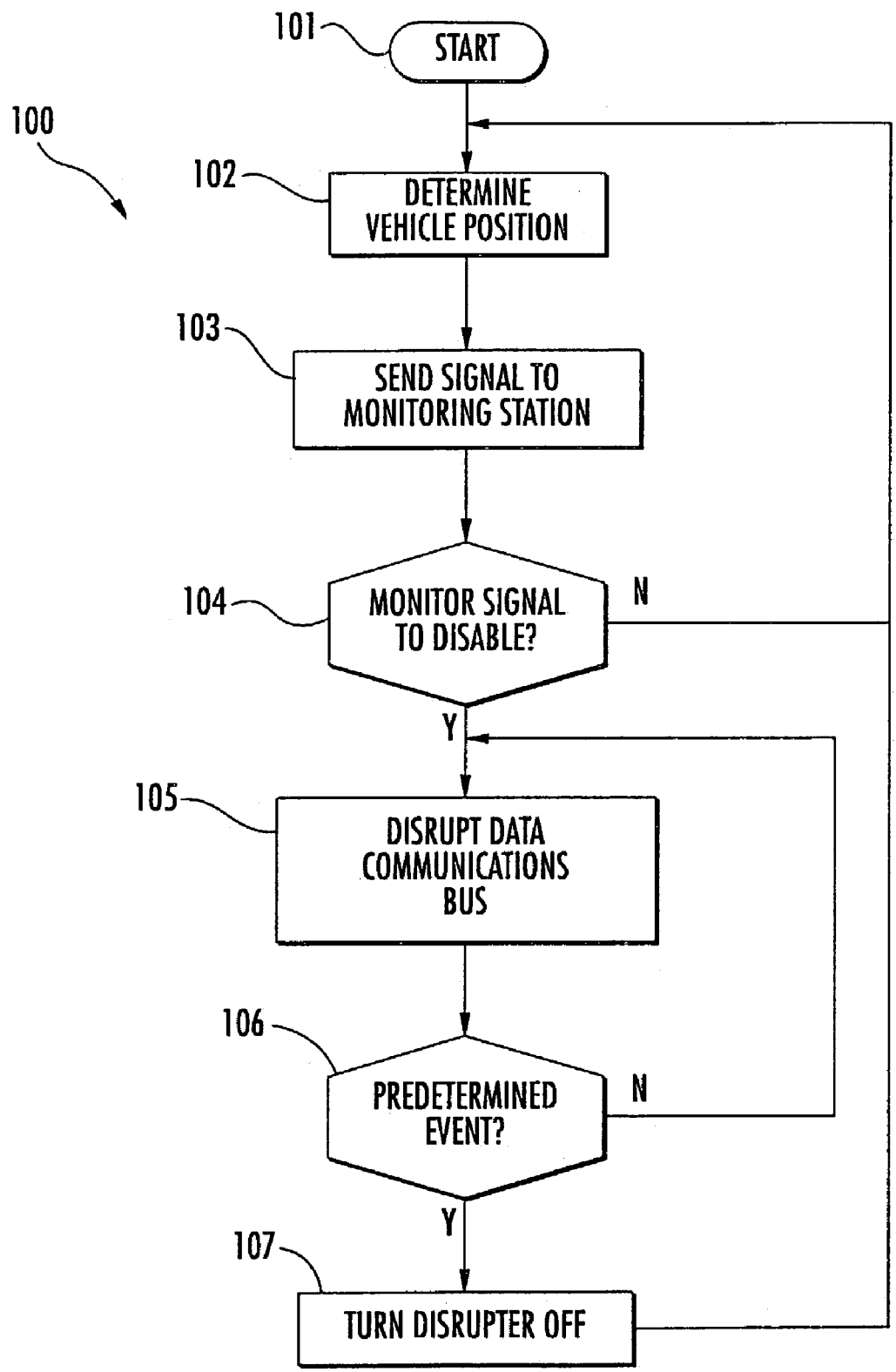

Turning now additionally to the flowchart 100 of FIG. 10, another method aspect of the vehicle security system 20 is now described. From the start (Block 101) the vehicle position is determined at Block 102. At Block 103 a signal containing the vehicle position is sent to the monitoring station 27. It may be sent on a preestablished schedule or based upon predetermined events as disclosed in the present inventor a copending patent application identified above.

At Block 104 it is determined whether an engine disable signal has been received. If the disable signal is received, then the vehicle data communications bus 30 is jammed at Block 105. At Block 106, it is determined whether a predetermined event has occurred. If it is determined at Block 106 that the predetermined event has not occurred, then disrupting is continued on the vehicle data communications bus 30. If, however, it is determined at Block 106 that the predetermined event has occurred, then the vehicle position is again determined at Block 102.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A vehicle security system for a vehicle comprising an engine, at least one vehicle engine device, and a vehicle data communications bus carrying communications for the at least one vehicle engine device, the vehicle security system comprising:
   at least one vehicle security sensor;
   a vehicle data communications bus disrupter for disrupting communications on the vehicle data communications bus for the at least one vehicle engine device; and
   a security controller for selectively operating said vehicle data communications bus disrupter based upon said at least one vehicle security sensor to disable the vehicle engine.

2. A vehicle security system according to claim 1 wherein the at least one vehicle engine device comprises an engine starter.

3. A vehicle security system according to claim 1 wherein the at least one vehicle engine device comprises an engine ignition device.

4. A vehicle security system according to claim 1 wherein the at least one vehicle engine device comprises an engine fuel supply device.

5. A vehicle security system according to claim 1 wherein said vehicle data communications bus disrupter is directly connected to the vehicle data communications bus.

6. A vehicle security system according to claim 5 wherein the data communications bus comprises a plurality of electrical conductors; and wherein said data communications bus disrupter connects the plurality of electrical conductors together.

7. A vehicle security system according to claim 5 wherein the data communications bus comprises at least one electrical conductor; and wherein said data communications bus disrupter connects the at least one electrical conductor to a reference voltage.

8. A vehicle security system according to claim 5 wherein the data communications bus comprises at least one electrical conductor; and wherein said data communications bus disrupter generates a data bus disruption signal onto the at least one electrical conductor.

9. A vehicle security system according to claim 1 wherein said vehicle data communications bus disrupter is inductively coupled to the vehicle data communications bus.

10. A vehicle security system according to claim 1 further comprising:
    a positioning determining device connected to said security controller; and
    a wireless communications device connected to said security controller for communicating position information to a monitoring station.

11. A vehicle security system according to claim 10 wherein said security controller is also for selectively operating said vehicle data communications bus disrupter responsive to the monitoring station.

12. A vehicle security system according to claim 1 wherein said at least one vehicle security sensor is connected to said security controller via the vehicle data communications bus.

13. A vehicle security system according to claim 12 wherein said security controller is switchable between armed and disarmed modes; and further comprising a remote transmitter carried by a user for switching said security controller between the armed and disarmed modes.

14. A vehicle security system according to claim 13 wherein said security controller turns of if said vehicle data communications bus disrupter based upon a predetermined event to permit renewed communications with said at least one vehicle security sensor.

15. A vehicle security system according to claim 14 wherein said predetermined event is at least one of the passage of a predetermined time, a predetermined number of vehicle ignition cycles, and a predetermined communication from the remote transmitter.

16. A vehicle security system according to claim 1 wherein said at least one vehicle security sensor comprises at least one of a door switch, a hood switch, a trunk switch, a proximity sensor, and a motion sensor.

17. A vehicle security system according to claim 1 further comprising at least one alarm indicator connected to said security controller.

18. A vehicle security system according to claim 17 wherein said alarm indicator is connected to said security controller via the vehicle data communications bus.

19. A vehicle security system according to claim 17 wherein said alarm indicator comprises at least one of a vehicle light, a vehicle horn, a siren, a speech message generator, and a remote pager.

20. A vehicle security system for a vehicle comprising a vehicle engine, at least one vehicle engine device, and a vehicle data communications bus carrying communications for the at least one vehicle engine device, the vehicle security system comprising:
- a vehicle position-determining device;
- a wireless communications device;
- a security controller cooperating with said wireless communications device and said vehicle position determining device for sending vehicle position information to a monitoring station; and
- a vehicle data communications bus disrupter rot disrupting communications on the vehicle data communications bus;
- said security controller also selectively operating said vehicle data communications bus disrupter based upon the monitoring station to disable the vehicle engine.

21. A vehicle security system according to claim 20 wherein the at least one vehicle engine devices comprises at least one of an engine starter, an engine ignition device, and an engine fuel supply device.

22. A vehicle security system according to claim 20 wherein the data communications bus comprises a plurality of electrical conductors; and wherein said data communications bus disrupter connects the plurality of electrical conductors together.

23. A vehicle security system according to claim 20 wherein the data communications bus comprises at least one electrical conductor; and wherein said data communications bus disrupter connects the at least one electrical conductor to a reference voltage.

24. A vehicle security system according to claim 20 wherein the data communications bus comprises at least one electrical conductor; and wherein said data communications bus disrupter generates a data bus disruption signal onto the at least one electrical conductor.

25. A vehicle security system according to claim 20 wherein said vehicle data communications bus disrupter is inductively coupled to the vehicle data communications bus.

26. A vehicle security system according to claim 20 wherein said security controller is switchable between armed and disarmed modes; and further comprising a remote transmitter carried by a user for switching said security controller between the armed and disarmed modes.

27. A vehicle security system according to claim 26 further comprising at least one alarm indicator connected to said security controller.

28. A method for disabling a vehicle engine for a vehicle comprising at least one vehicle engine device, and a vehicle data communications bus carrying communications for the at least one vehicle engine device, the method comprising:
- selectively disrupting communications on the vehicle data communications bus to disable the vehicle engine.

29. A method according to claim 28 wherein the at least one vehicle engine device comprises at least one of an engine starter, an engine ignition device, and an engine fuel supply device.

30. A method according to claim 28 wherein selectively disrupting comprises directly connecting a vehicle data communications bus disrupter to the vehicle data communications bus.

31. A method according to claim 30 wherein the vehicle data communications bus comprises a plurality off electrical conductors; and wherein the vehicle data communications bus disrupter connects the plurality of electrical conductors together.

32. A method according to claim 30 wherein the vehicle data communications bus comprises at least one electrical conductor; and wherein the vehicle data communications bus disrupter connects the at least one electrical conductor to a reference voltage.

33. A method according to claim 30 wherein the vehicle data communications bus comprises at least one electrical conductor; and wherein the vehicle data communications bus disrupter generates a data bus disruption signal onto the at least one electrical conductor.

34. A method according to claim 28 wherein the vehicle data communications bus disrupter is inductively coupled to the vehicle data communications bus.

35. A method according to claim 28 wherein selectively disrupting is responsive to at least one control signal from at least one control device.

36. A method according to claim 35 wherein said at least one control device comprises at least one of a vehicle security controller, a token reader, a biometric reader, a remote station receiver, a personal identification number code reader, and an ignition switch sensor.

37. A vehicle control system for a vehicle comprising at least one vehicle device, and a vehicle data communications bus carrying communications for the at least one vehicle device, the data communications bus including at least one electrical conductor, the vehicle control system comprising:
- a vehicle data communications bus disrupter for disrupting communications on the vehicle data communications bus for the at least one vehicle device, said vehicle data bus communications bus disrupter disrupting communications on the vehicle data communications bus by connecting the at least one electrical conductor to a reference voltage; and
- at least one control device for selectively operating said vehicle data communications bus disrupter.

38. A vehicle control system according to claim 37 wherein the at least one vehicle device comprises at least one of an engine starter; an engine ignition device; and an engine fuel supply device.

39. A vehicle control system according to claim 37 wherein said at least one control device comprises a vehicle security controller.

40. A vehicle control system according to claim 39 wherein said security controller is also for selectively operating said vehicle data communications bus disrupter responsive to a remote station.

41. A vehicle control system according to claim 37 wherein said at least one control device comprises at least one of a token reader, a biometric reader, a remote station receiver, and a personal identification number code reader.

42. A vehicle control system according to claim 37 wherein said at least one control device comprises an ignition switch sensor.

43. A vehicle data communications bus disrupter for a vehicle comprising a vehicle data communications bus carrying communications for at least one vehicle device, and the vehicle data communications bus including a plurality of electrical conductors, the vehicle data communications bus disrupter comprising:

control logic for receiving at least one control signal; and an output circuit to be coupled to the vehicle data communications bus and being responsive to said control logic for selectively disrupting communications on the vehicle data communications bus for the at least one vehicle device based upon the at least one control signal, and said output circuit comprising a disrupting signal generator comprising at least one switch for connecting the plurality of electrical conductors together to disrupt communications on the vehicle data communications bus.

44. A vehicle data communications bus disrupter according to claim 43 wherein the at least one vehicle device comprise at least one of an engine starter, an engine ignition device, and an engine fuel supply device.

45. A vehicle data communications bus disrupter according to claim 43 wherein the at least one control signal comprises at least one of a vehicle security controller, a token reader, a biometric reader, a remote station receiver, a personal identification number code reader, and an ignition switch sensor.

46. A method for disabling a vehicle engine for a vehicle comprising at least one vehicle engine device, and a vehicle data communications bus carrying communications for the at least one vehicle engine device, and the vehicle data communications bus including at least one electrical conductor, the method comprising:

selectively disrupting communications on the vehicle data communications bus to disable the vehicle engine; and coupling an output circuit to the vehicle data communications bus for selectively disrupting communications on the vehicle data communications bus for the at least one vehicle device based upon at least one control signal, and the output circuit comprising a disrupting signal generator for generating a disrupting signal onto the at least one electrical conductor.

47. A method according to claim 46 wherein the at least one vehicle engine device comprises at least one of an engine starter, an engine ignition device, and an engine fuel supply device.

48. A method according to claim 46 wherein selectively disrupting comprises directly connecting a vehicle data communications bus disrupter to the vehicle data communications bus.

49. A method according to claim 48 wherein the vehicle data communications bus further comprises a plurality of electrical conductors; and wherein the vehicle data communications bus disrupter connects the plurality of electrical conductors together.

50. A method according to claim 48 wherein the vehicle data communications bus disrupter connects the at least one electrical conductor to a reference voltage.

51. A method according to claim 48 wherein the vehicle data communications bus disrupter generates a data bus disruption signal onto the at least one electrical conductor.

52. A method according to claim 46 wherein the vehicle data communications bus disrupter is inductively coupled to the vehicle data communications bus.

53. A method according to claim 46 wherein selectively disrupting is responsive to at least one control signal from at least one control device.

54. A method according to claim 53 wherein said at least one control device comprises a least one of a vehicle security controller, a token reader, a biometric reader, a remote station receiver, a personal identification number code reader, and an ignition switch sensor.

55. A method according to claim 46 wherein the output circuit further comprises an inductive coupling interface for inductively coupling the disrupting signal generator onto the at least one electrical conductor.

56. A method according to claim 46 wherein the at least one control signal comprises at least one of a vehicle security controller, a token reader, a biometric reader, a remote station receiver, a personal identification number code reader, and an ignition switch sensor.

* * * * *

UNITED STATES PATENT AND TRADEMARK OFFICE
CERTIFICATE OF CORRECTION

PATENT NO. : 7,061,137 B2 Page 1 of 1
APPLICATION NO. : 10/271626
DATED : June 13, 2006
INVENTOR(S) : Kenneth E. Flick It is certified that error appears in the above-identified patent and that said Letters Patent is hereby corrected as shown below:

Column 1, Line 57    Delete: "looks"
                     Insert: -- locks --

Column 4, Line 43    Delete: "device, an"
                     Insert: -- device, and an --

Column 9, Line 35    Delete: "inventor a"
                     Insert: -- inventor's --

Column 11, Line 20   Delete: "rot"
                     Inset --for --

Column 12, Line 6    Delete: "off"
                     Insert: -- of --

Signed and Sealed this

Nineteenth Day of December, 2006

JON W. DUDAS
*Director of the United States Patent and Trademark Office*